(12) United States Patent
Casses et al.

(10) Patent No.: US 10,109,960 B2
(45) Date of Patent: Oct. 23, 2018

(54) CABLE ATTACHMENT DEVICE AND CONNECTION ASSEMBLY FOR MEASURING CABLE TEMPERATURE

(71) Applicant: Delphi International Operations Luxembourg S.A.R.L., Bascharage (LU)

(72) Inventors: Claude Casses, Maintenon (FR); Gaelle Le Saux, Chartres (FR)

(73) Assignee: Delphi International Operations Luxembourg SARL, Luxembourg (LU)

( * ) Notice: Subject to any disclaimer, the term of this patent is extended or adjusted under 35 U.S.C. 154(b) by 18 days.

(21) Appl. No.: 15/591,731

(22) Filed: May 10, 2017

(65) Prior Publication Data
US 2017/0346241 A1 Nov. 30, 2017

(51) Int. Cl.
*H01R 13/72* (2006.01)
*F16L 3/12* (2006.01)
*H01R 13/66* (2006.01)
*G01K 1/14* (2006.01)

(52) U.S. Cl.
CPC .......... *H01R 13/6683* (2013.01); *G01K 1/14* (2013.01); *G01K 1/143* (2013.01); *H01R 13/72* (2013.01); *F16L 3/12* (2013.01)

(58) Field of Classification Search
CPC ...... H01R 13/6683; H01R 13/72; G01K 1/14; G01K 1/143; F16L 3/12
See application file for complete search history.

(56) References Cited

U.S. PATENT DOCUMENTS

| 3,357,455 | A | * | 12/1967 | Plummer | F16L 3/222 138/106 |
| 4,244,542 | A | * | 1/1981 | Mathews | F16L 3/222 138/112 |
| 4,410,379 | A | * | 10/1983 | Franckx | B29C 61/0641 156/54 |
| 4,553,432 | A | * | 11/1985 | Barlian | G01K 1/143 219/505 |
| 4,680,065 | A | * | 7/1987 | Vansant | B29C 61/0625 156/273.9 |
| 4,804,020 | A | * | 2/1989 | Bartholomew | B29C 65/58 138/111 |

(Continued)

FOREIGN PATENT DOCUMENTS

| CN | 102872556 A | 1/2013 |
| CN | 103367939 A | 10/2013 |

(Continued)

*Primary Examiner* — Briggitte R Hammond
(74) *Attorney, Agent, or Firm* — Robert J. Myers

(57) ABSTRACT

An attachment device for cables is described herein. This attachment device includes a central body formed of a plastic material and defining a cavity configured to receive a temperature probe and a plurality of straps extending from the central body, each strap of the a plurality of straps configured to secure a cable to the central body, wherein the central body defines a wall having a first side configured to be in contact with the temperature probe and a second side in contact with a cable. This attachment device may notably be used in an electrical connection assembly having a connector, a temperature sensor disposed within the device, and at least two cables.

13 Claims, 2 Drawing Sheets

(56) References Cited

U.S. PATENT DOCUMENTS

| | | | | |
|---|---|---|---|---|
| 6,899,304 B2* | 5/2005 | Bellmore | ............... | F16L 3/1203 |
| | | | | 24/485 |
| 7,041,912 B2* | 5/2006 | Kadrnoska | ............ | G02B 6/4459 |
| | | | | 174/138 G |
| 7,465,879 B2* | 12/2008 | Glew | .................... | H01B 7/0892 |
| | | | | 174/113 C |
| 7,473,850 B2* | 1/2009 | Glew | ..................... | H01B 11/06 |
| | | | | 174/113 C |
| 7,642,451 B2* | 1/2010 | Bonn | ................. | H01B 11/1856 |
| | | | | 174/102 P |
| 8,353,485 B2* | 1/2013 | Hjerpe | ..................... | F16L 3/222 |
| | | | | 211/182 |
| 9,853,434 B2* | 12/2017 | Vaccaro | .................... | H02G 3/32 |
| 2009/0272576 A1* | 11/2009 | Medina | ............... | B60R 16/0215 |
| | | | | 174/72 A |
| 2016/0153839 A1* | 6/2016 | Hong | ..................... | G01K 1/143 |
| | | | | 374/100 |

FOREIGN PATENT DOCUMENTS

| | | |
|---|---|---|
| CN | 204332535 U | 5/2015 |
| JP | 5422479 B2 | 2/2014 |

\* cited by examiner

CABLE ATTACHMENT DEVICE AND CONNECTION ASSEMBLY FOR MEASURING CABLE TEMPERATURE

CROSS-REFERENCE TO RELATED APPLICATION

This application claims the benefit under 35 U.S.C. § 119(a) of Patent Application No. 1654701 filed in the Institut National de la Propriété Industrielle (French Patent Office) on May 25, 2016, the entire disclosure of which is hereby incorporated by reference.

TECHNICAL FIELD OF THE INVENTION

The invention relates to the field of automobile vehicles and notably, but not exclusively, to the fields of electrical cabling for motor vehicles and of electrical connectors for motor vehicles.

BACKGROUND OF THE INVENTION

In the field of motor vehicles and notably of electric or hybrid vehicles, it is necessary to detect abnormal heating events in electrical cables in order to prevent any damage, or even fire, to the vehicles. This aspect is particularly important during operations for recharging batteries, which may be carried out with current intensities that can go up to 125 A.

For this purpose, as disclosed for example in the document JP5422479, the idea is to measure the temperature of each cable by means of a temperature probe (or sensor), respectively placed in the vicinity of the latter on a fixed support on a connection receptacle.

However, this type of device of the prior art notably exhibits the following drawbacks:
- the support is designed and fabricated for a particular model of receptacle; changing a model of receptacle may require a new support to be designed;
- its size is relatively bulky;
- the overall cost of this function "measurement of temperature of the cables" is also relatively high.

It is therefore important to propose a new solution solving these problems.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF SUMMARY OF THE INVENTION

According to a first embodiment of the invention, an attachment device for cables is provided The attachment device includes. a central body formed of a plastic material and defining a cavity configured to receive a temperature probe and a plurality of straps extending from the central body. Each strap of the a plurality of straps is configured to secure a cable to the central body. The central body defines a wall having a first side configured to be in contact with the temperature probe and a second side in contact with a cable.

The plurality of straps may be integrally formed with the central body. The straps may be configured to pressure to the cable in order to maintain contact between the cable and the second side of the wall. The plurality of straps may form jaws configured for retaining the two cable.

According to a second embodiment of the invention, an electrical connector assembly is provided. The electrical connection assembly includes a connector, at least two cables, the attachment device described above holding the two cables within the plurality of straps, and a temperature probe disposed within the cavity.

The attachment device may be self-supported by the two cables. The temperature probe may be essentially equidistant from the cables. The electrical connection assembly includes a receptacle in which contacts connected to the cables are accommodated and a cover for at least partially enclosing the receptacle. The cover has an opening for the passage of the cables and the attachment device is mounted on the cables between the opening of the cover and the receptacle. The plurality of straps may form jaws configured for retaining the two cables.

BRIEF DESCRIPTION OF THE SEVERAL VIEWS OF THE DRAWING

The present invention will now be described, by way of example with reference to the accompanying drawings, in which.

In the figures, the same references denote identical or similar elements.

DETAILED DESCRIPTION OF THE INVENTION

A non-limiting example of an attachment device 1 is described herein below with reference to FIGS. 1 and 2.

Figure 1:
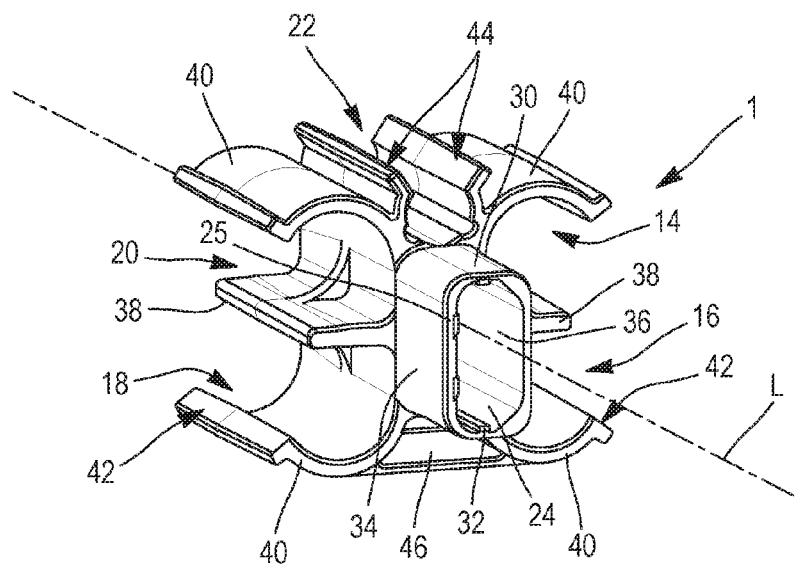
FIG. 1 shows a perspective view of a first exemplary embodiment of an attachment device according to the invention.
Figure 2:
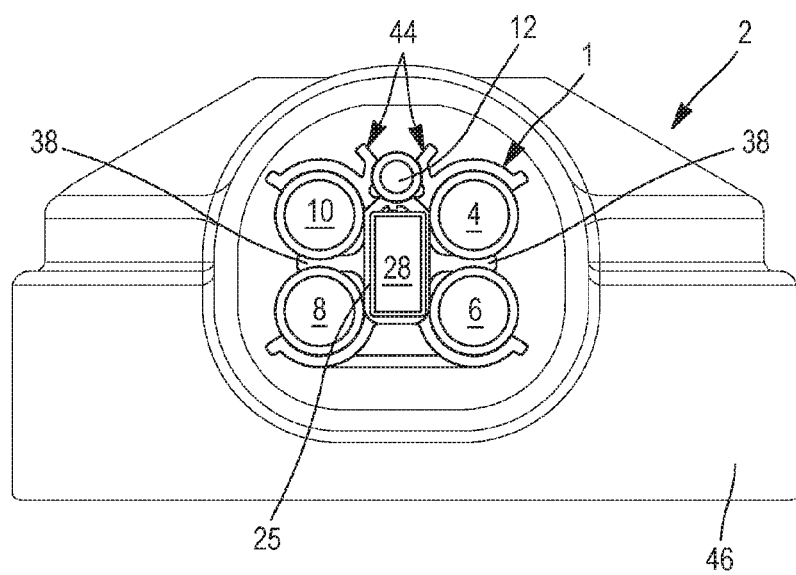
FIG. 2 shows an elevation view of one example of a connection assembly comprising the attachment device in FIG. 1.

According to this example, the attachment device 1 is designed to be mounted in a connection assembly comprising a connector 2 for a charging point of an electric vehicle (see FIG. 2). During charging, the currents flowing through the cables 4, 6, 8, 10, 12 connected to this connector 2 may, for example, reach 125 A. The cross-section of these cables is therefore large, e.g. 16 mm² for three phase cables 4, 6, 8 and the ground cable 10. The cables 4, 6, 8, 10 are therefore relatively rigid and the attachment device 1 needs to be robust in order to hold the whole assembly without breaking or deforming. Furthermore, the attachment device 1 comprises harnesses 14, 16, 18, 20, 22 (at least one harness per cable whose temperature it is desired to monitor—see FIG. 1) forming a "C" in transverse cross-section whose free ends must be able to be parted in order to insert a cable 4, 6, 8, 10 or 12 into it. The attachment device 1 must therefore exhibit a certain flexibility.

The attachment device 1 is a single block made of molded plastic material. The plastic material and the dimensioning of the attachment device 1 are chosen so that, as indicated hereinabove, the attachment device 1 is sufficiently robust, while at the same time conserving the possibility of elastically deforming it. Furthermore, the plastic material is chosen in such a manner that the attachment device 1 renders the connection assembly lighter than the solutions of the prior art: taping up, filling of a cavity comprising a temperature probe (or "potting" according to the terminology of the art), etc. The plastic material is for example chosen from within the list comprising polyamide (PA) and polybutylene terephthalate (PBT).

In the example shown in FIG. 1, the attachment device 1 comprises five harnesses 14, 16, 18, 20, 22. Four of these harnesses 14, 16, 18, 20 are divided into two symmetrical pairs 14, 16 and 18, 20 on either side of a rectangular body 24 forming an accommodation designed to receive a temperature probe 28 (see FIG. 2). Each harness 14, 16, 18, 20 or 22 forms a claw enclosing a cable 4, 6, 8, 10 or 12 so as to retain the attachment device 1 on this cable. The attachment device 1 thus holds all of the cables 4, 6, 8, 10, 12 together.

The rectangular body 24 forms a cavity which extends along a longitudinal axis L with an essentially rectangular cross-section (generally speaking, the cavity—or accommodation—24 is not necessarily rectangular and may for example have any given cylindrical shape, of revolution or otherwise). The transverse cross-section of this rectangular body 24, perpendicular to the longitudinal axis L, comprises two small sides 30, 32 and two large sides 34, 36. The wall 25 of the rectangular body 24 has a thickness at the apices of the rectangle of the transverse cross-section for example close to, or equal to, 1 mm. Each cable 4, 6, 8, 10, 12 is thus positioned equidistant from the temperature probe 28, in contact with the wall 25, whereas the temperature probe 28 is placed on the other side of the wall 25, also in contact with the latter.

A partition 38 separates the two harnesses (14, 16 or 18, 20) of each pair of harnesses. This partition 38 is essentially perpendicular to the two large sides 34, 36 of the rectangular body 24. A flexible strap 40 forming a hook essentially extends from one edge of the rectangular body 24 (in other words, from the apex of the rectangle of the transverse cross-section) and returns towards its free end towards the plane of a partition 38. Each partition 38 and a strap 40 thus form a harness 14, 16, 18, 20 in which a cable 4, 6, 8, 10 of large diameter (in other words one of the three phase cables or the ground cable) can be clamped and retained. The free edge of each strap 40 comprises a ledge 42 so as to form a flare on the opening of each harness 14, 16, 18, 20 in order to facilitate the insertion of a cable into the latter.

A fifth harness 22 is formed between two pairs of harnesses, on one of the two small sides 30, 32 of the rectangular body 24. This fifth harness 22 is intended to receive and hold the cable of the neutral 12. The latter has a smaller cross-section that the four preceding ones 4, 6, 8, 10, which is for example 4 mm$^2$. The free edge of this fifth harness 22 comprises, on either side, a ledge 44 forming a flare facilitating the insertion of a cable 12 into the latter.

The small face of the rectangular body 24, opposite to that on which the fifth harness 22 is formed, comprises a reinforcement endowing the attachment device 1 with a greater robustness.

In FIG. 2, the attachment device 1 is shown with the cables 4, 6, 8, 10, 12 inserted into the harnesses 14, 16, 18, 20, 22, together with the temperature probe 28 inserted into its accommodation formed from the rectangular body 24. The attachment device 1 is presented with the longitudinal axis L of the rectangular body 24 parallel to that of the cables 4, 6, 8, 10, 12 over their portion inserted into the harnesses 14, 16, 18, 20, 22, and parallel to the longitudinal axes of the contacts (not visible in the figures) accommodated within the receptacle 46 of the connector 2. Each strap 40 receiving a cable 4, 6, 8 or 10 of large cross-section forms means for applying pressure in order to hold and press this cable 4, 6, 8 or 10 against the wall 25 of the rectangular body 24 receiving the temperature probe 28.

Figure 6:
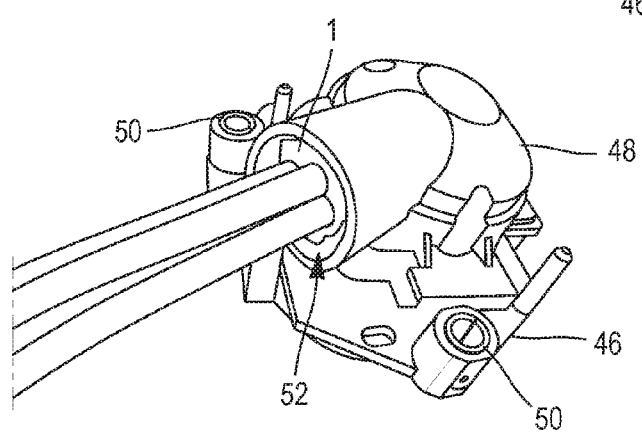
FIG. 6 shows a perspective view of a connection assembly such as that in FIGS. 2 and 5, with a cover.

FIG. 6 shows an electrical connection assembly comprising a connector 2, cables 4, 6, 8, 10, 12 and an attachment device 1 holding these cables 4, 6, 8, 10, 12 together.

In this FIG. 6, it can be seen that, when the receptacle 46 is closed by a cover 48, the cables 4, 6, 8, 10, 12 extend away from the receptacle 46 in a direction substantially parallel to the plane of the receptacle 46 (this plane is essentially perpendicular to the axis of the eyelets 50 for fixing the receptacle 46 onto a support). The cover 48 comprises an opening 52 for the passage of the cables. The attachment device 1 is mounted on the cables between the opening 52 of the cover 48 and the receptacle 46 (hence with the longitudinal axis L of the rectangular body 24 more or less parallel to the plane of the receptacle 46 in contrast to what is shown in FIG. 2).

Figure 3:
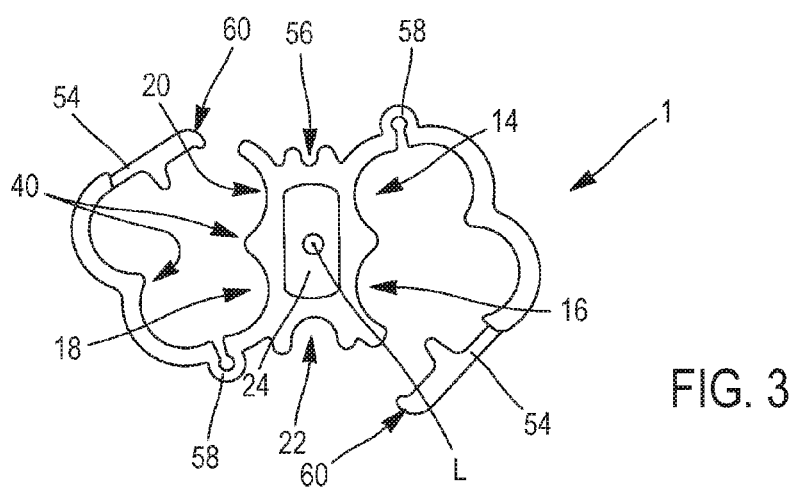
FIG. 3 shows a transverse cross-section view of a second exemplary embodiment of an attachment device according to the invention.

FIG. 3 shows a second non-limiting example of an attachment device 1. In FIG. 3, the attachment device 1 is shown in a transverse cross-section halfway along its length (i.e. its dimension parallel to the longitudinal axis L).

This embodiment differs from the preceding one essentially by the shape of the harnesses 14, 16, 18, 20, 22. According to this embodiment, the cables 4, 6, 8, 10 with a wider cross-section are no longer clamped between a partition and a flexible strap. Each of them is enclosed within a tubular cavity enclosed by a strap 54. The strap 54 avoids having to make use of less productive methods such as wrapping with an adhesive tape.

As in the preceding embodiment, four harnesses 14, 16, 18, 20 are divided into two symmetrical pairs 14, 16 and 18, 20 on either side of a rectangular body 24. The rectangular body 24 is designed to receive a temperature probe 28 (see FIG. 5). The rectangular body 24 has essentially the same shape as in the preceding embodiment.

Each strap 54 is connected to the central block 56 comprising the rectangular body 24 with an articulation 58 essentially parallel to the longitudinal axis L of the rectangular body 24. Each strap 54 also comprises straps 40 similar to those of the central block 56. The free end of each strap 54, on the side opposite to the articulation 58, is equipped with a hook 60 allowing each strap 54 to be closed over a pair of cables of large cross-section. One of the hooks 60 also closes over a harness 22 receiving a cable 12 with a smaller cross-section.

Figure 4:
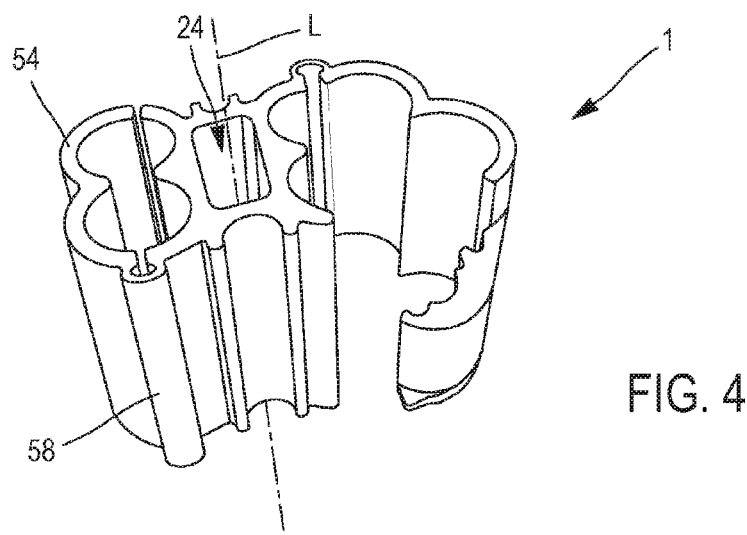
FIG. 4 shows a perspective view of the attachment device in FIG. 3, with a closed strap.
Figure 5:
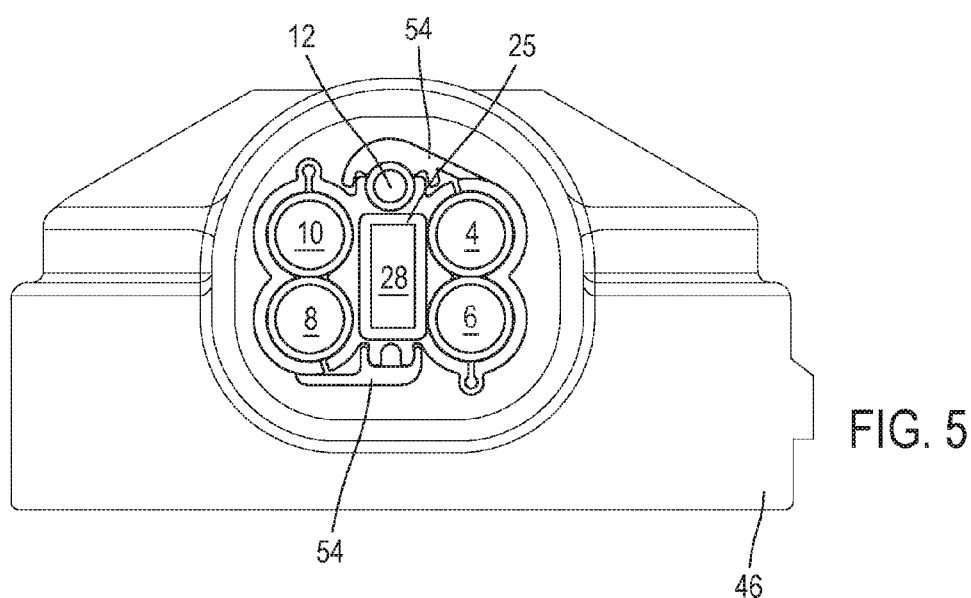
FIG. 5 shows an elevation view of another example of a connection assembly comprising the attachment device in FIGS. 3 and 4.

In FIG. 4, once the strap 54 is closed. It is observed that the straps 40 of the central block 56 and those of a strap 54 form tubular cavities whose wall is almost closed. Each tubular cavity extends longitudinally parallel to the longitudinal axis L of the rectangular body 24. As shown in FIG. 5, when the strap 54 is closed over these tubular cavities and the latter receive a cable 4, 6, 8, 10 or 12, the strap 54 forms a means for applying pressure in order to hold and press each cable against the wall 25 of the rectangular body 24 receiving the temperature probe 28.

As for the preceding embodiment, when the receptacle 46 is closed by a cover 48, the attachment device 1 is mounted on the cables 4, 6, 8, 10, 12 between the opening of the cover 48 and the receptacle 46.

In the two preceding embodiments, the attachment device 1 is retained on the cables 4, 6, 8, 10, 12 but is not rigidly attached to the receptacle 46. The attachment device 1 is self-supported by the cables 4, 6, 8, 10, 12. The attachment device 1 also plays a support role, notably during the phases for assembly of the connector 2, since it holds all the cables 4, 6, 8, 10, 12 of the connector 2, together with the temperature probe 28. This facilitates the cabling operations and operations for mounting of the connector 2.

According to the method for measuring the temperature according to the invention, an attachment device 1 (for example such as that of the first or of the second embodiment described hereinabove) is used comprising harnesses 14, 16, 18, 20 peripheral to a central rectangular body 24, in which a temperature probe 28 is placed. The cables 4, 6, 8, 10 whose temperature it is desired to measure are placed in the harnesses 14, 16, 18, 20. Their temperature is measured through the wall 25 of the rectangular body 24 in contact with which they are elastically pressed.

It will be noted that the attachment device 1 offers the following advantages:
- the central position of the temperature probe 28 allows the variations in temperature of any of the cables 4, 6, 8, 10, 12 to be detected; a single probe is therefore sufficient, which is particularly cost-effective;
- the attachment device 1 can have relatively standardized dimensions, independent of the dimensions of the connector 2; a fact which allows simplification of the logistics (only one reference to manage) and of the assembly, and is particularly cost-effective; and
- by virtue of the proximity between the cables 10 and the temperature probe 28, the detection of an abnormal heat build-up is faster than when the temperature probe 28 is placed in the receptacle 46 of the connector 2; similarly, the measurement is particularly reliable owing to the position of the temperature probe 28 under a cover 48.

While this invention has been described in terms of the preferred embodiments thereof, it is not intended to be so limited, but rather only to the extent set forth in the claims that follow. Moreover, the use of the terms first, second, primary secondary, etc. does not denote any order of importance, but rather the terms first, second, etc. are used to distinguish one element from another. Furthermore, the use of the terms a, an, etc. do not denote a limitation of quantity, but rather denote the presence of at least one of the referenced items.

We claim:

1. A cable attachment device, comprising:
a central body formed of a plastic material and defining a central cavity;
a partition extending perpendicularly from the central body; and
an arcuate flexible strap extending from the central body forming a hook shape and curved toward the partition, wherein the strap and the partition are configured to secure a cable to the central body, wherein the central body defines a wall having a first side forming the central cavity and a second side in contact with the cable.

2. The cable attachment device according to claim 1, wherein the strap is integrally formed with the central body.

3. The cable attachment device according to claim 1, wherein the strap is configured to apply pressure to the cable in order to maintain contact between the cable and the second side of the wall.

4. The cable attachment device according to claim 1, wherein the strap forms a jaw configured to retain the cable.

5. The cable attachment device according to claim 1, wherein a free edge of each strap comprises a ledge forming a flare configured to facilitate the insertion of the one cable between each strap and the partition.

6. An electrical connection assembly, comprising:
a connector;
a cable;
the cable attachment device according to claim 1;
a temperature probe, wherein the temperature probe is disposed within the cavity and wherein the central body defines a wall having a first side configured to be in contact with the temperature probe and a second side in contact with the cable;
a receptacle in which a contact connected to the cable is accommodated; and
a cover configured to at least partially enclose the receptacle, wherein the cover defines an opening though which the cable passes and wherein the attachment device is mounted on the cable between the opening of the cover and the receptacle.

7. An electrical connection assembly, comprising:
a connector;
at least two cables;
a cable attachment device comprising:
a central body formed of a plastic material and defining a cavity within, and
a plurality of straps extending from the central body, each strap of the plurality of straps configured to secure one cable of the at least two cables to the central body, wherein the attachment device holds the at least two cables within the plurality of straps;
a temperature probe, wherein the temperature probe is disposed within the cavity and wherein the central body defines a wall having a first side configured to be in contact with the temperature probe and a second side in contact with the at least two cables;
a receptacle in which contacts connected to the at least two cables are accommodated; and
a cover configured to at least partially enclose the receptacle, wherein the cover defines an opening through which the at least two cables pass and wherein the attachment device is mounted on the at least two cables between the opening of the cover and the receptacle.

8. The electrical connection assembly according to claim 7, wherein the plurality of straps are integrally formed with the central body.

9. The electrical connection assembly according to claim 7, wherein the plurality of straps are configured to apply pressure to the cable in order to maintain contact between the cable and the second side of the wall.

10. The electrical connection assembly according to claim 7, wherein the plurality of straps form jaws configured to retain the cable.

11. The electrical connection assembly according to claim 7, wherein the attachment device is self-supported by the at least two cables.

12. The electrical connection assembly according to claim 7, wherein the temperature probe is essentially equidistant from the at least two cables.

13. The electrical connection assembly according to claim 7, wherein the plurality of straps form jaws configured for retaining the at least two cables.

\* \* \* \* \*